(12) United States Patent
Pruett

(10) Patent No.: US 6,643,090 B1
(45) Date of Patent: Nov. 4, 2003

(54) MULTI-MODE SERVO POSITION ERROR SIGNAL DEMODULATOR CIRCUIT

(75) Inventor: David C. Pruett, Allen, TX (US)

(73) Assignee: Seagate Technology LLC, Scotts Valley, CA (US)

( * ) Notice: Subject to any disclaimer, the term of this patent is extended or adjusted under 35 U.S.C. 154(b) by 483 days.

(21) Appl. No.: 09/698,909

(22) Filed: Oct. 26, 2000

Related U.S. Application Data

(60) Provisional application No. 60/193,303, filed on Mar. 30, 2000.

(51) Int. Cl.[7] .................................................. G11B 5/596
(52) U.S. Cl. .................................................... 360/78.04
(58) Field of Search .......................... 360/78.04, 77.08, 360/77.02, 77.05; 318/636, 561, 608; 714/806

(56) References Cited

U.S. PATENT DOCUMENTS

| | | | |
|---|---|---|---|
| 4,412,165 A | 10/1983 | Case et al. | |
| 4,724,370 A | 2/1988 | Moraru et al. | |
| 4,740,736 A | 4/1988 | Sidman et al. | |
| 4,931,888 A | 6/1990 | Taguchi et al. | |
| 5,109,307 A | 4/1992 | Sidman | |
| 5,781,360 A | 7/1998 | Wilson et al. | |
| 5,793,556 A | 8/1998 | Freitas | |
| 6,046,879 A | 4/2000 | Hampshire | |
| 6,049,441 A | 4/2000 | Ottesen | |
| 6,324,132 B1 * | 11/2001 | Kagami et al. | 369/32 |

* cited by examiner

Primary Examiner—David Hudspeth
Assistant Examiner—Mitchell Slavitt
(74) Attorney, Agent, or Firm—Fellers, Snider, et al.

(57) ABSTRACT

Apparatus and method for positioning a head adjacent tracks on a recording surface in a disc drive. A servo control circuit includes a multi-mode servo position error signal (PES) demodulator circuit having an operand generator which outputs operand values from decoded servo position data transduced by the head from the disc surface, and a PES generator which generates a PES indicative of head position with respect to the disc surface in accordance with a selected PES mode from a population of mutually exclusive PES modes each derived from a different combination of selected operand values. A programmable servo processor outputs a current adjustment signal to adjust the current applied to an actuator motor in relation to the PES and a desired position. The servo processor selectably configures the PES generator for each track so that different PES modes are used for different tracks.

17 Claims, 8 Drawing Sheets

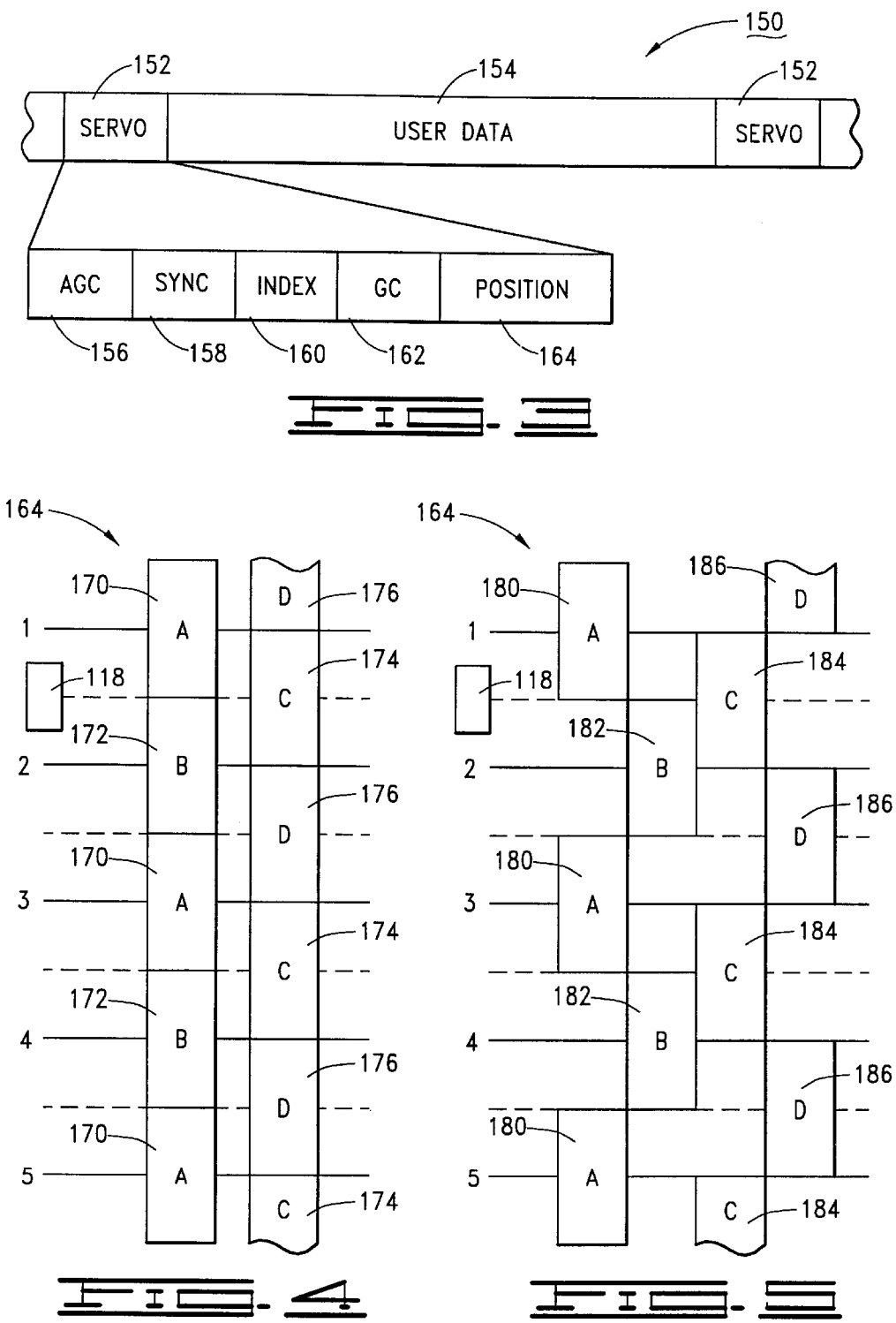

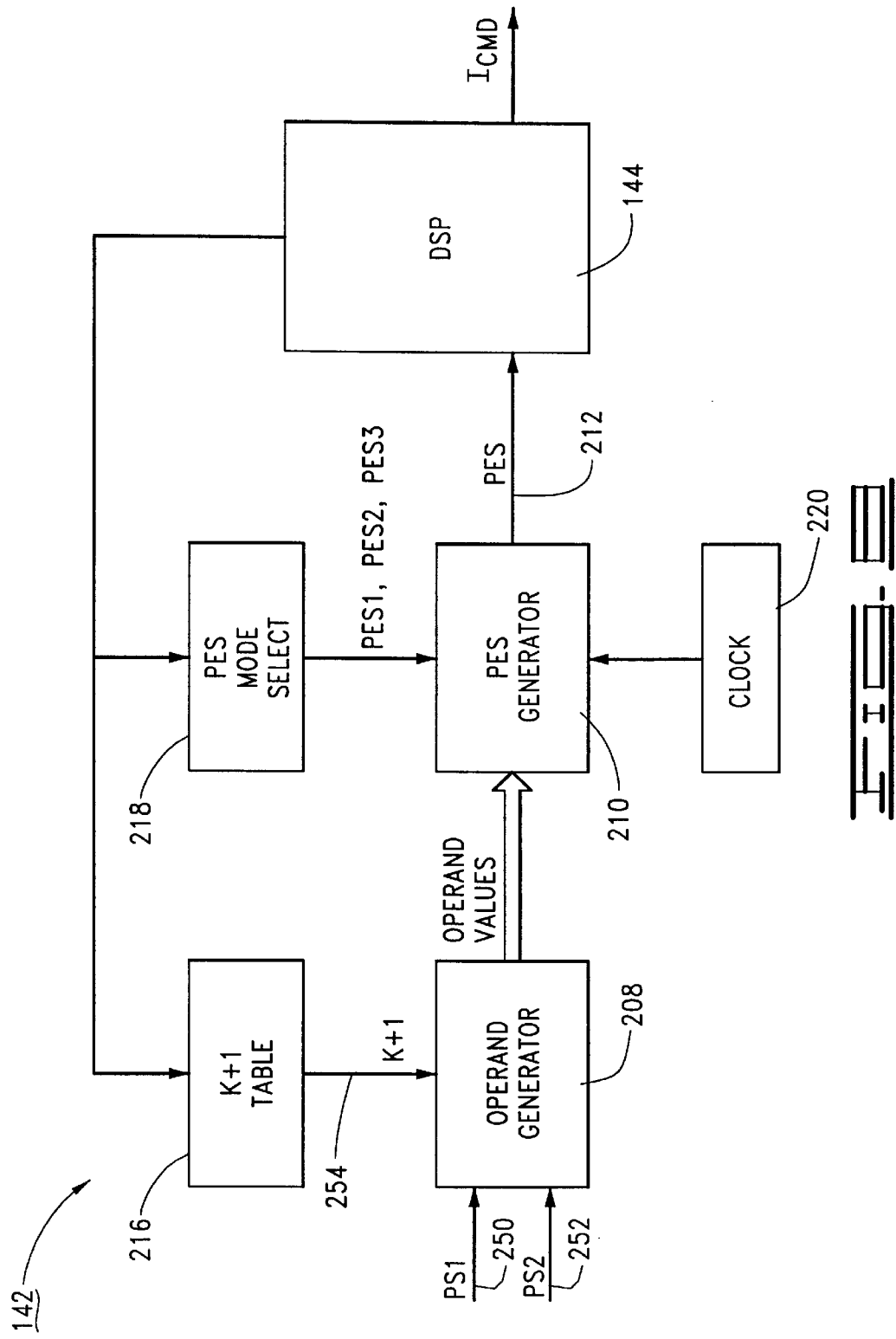

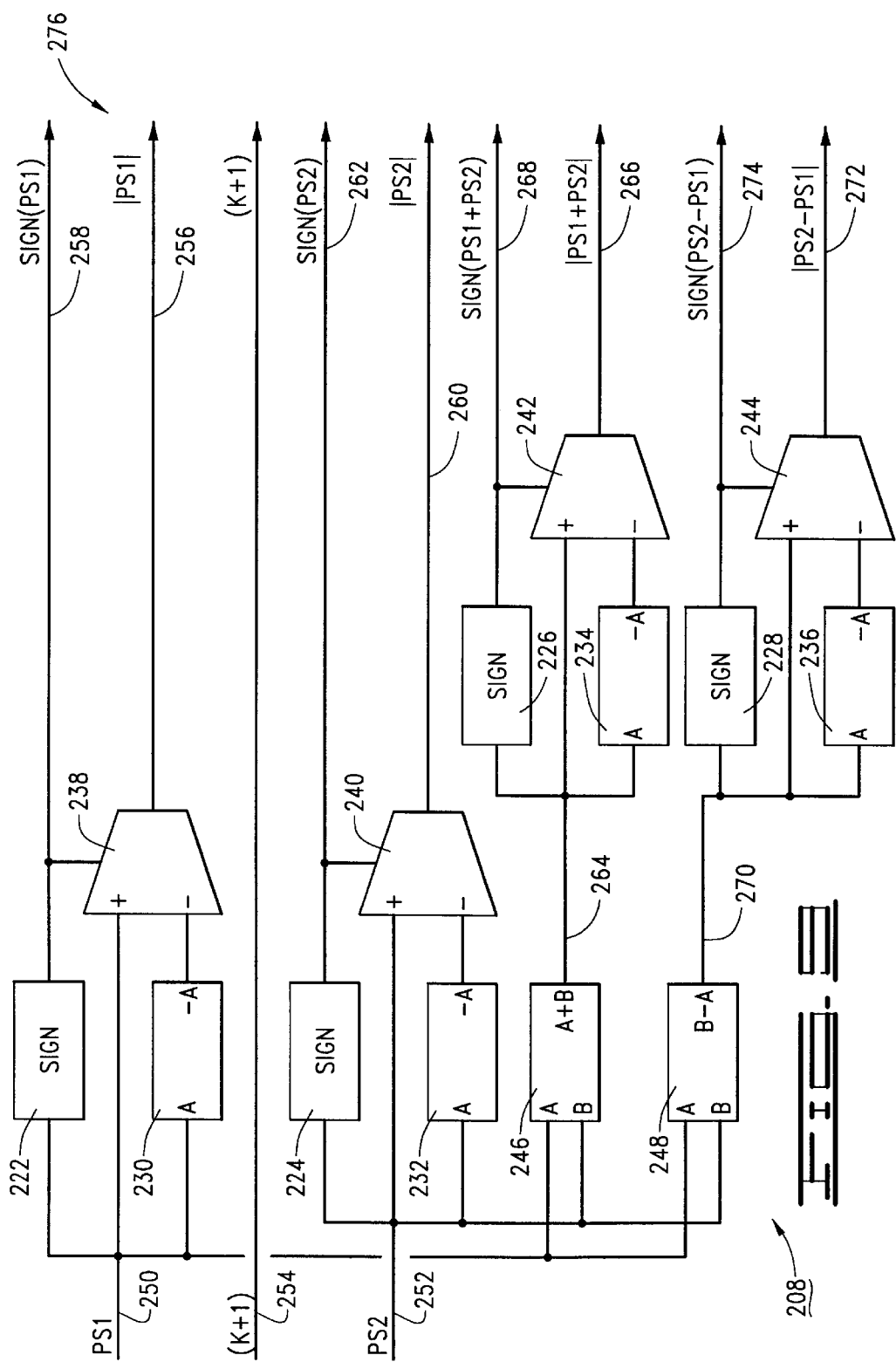

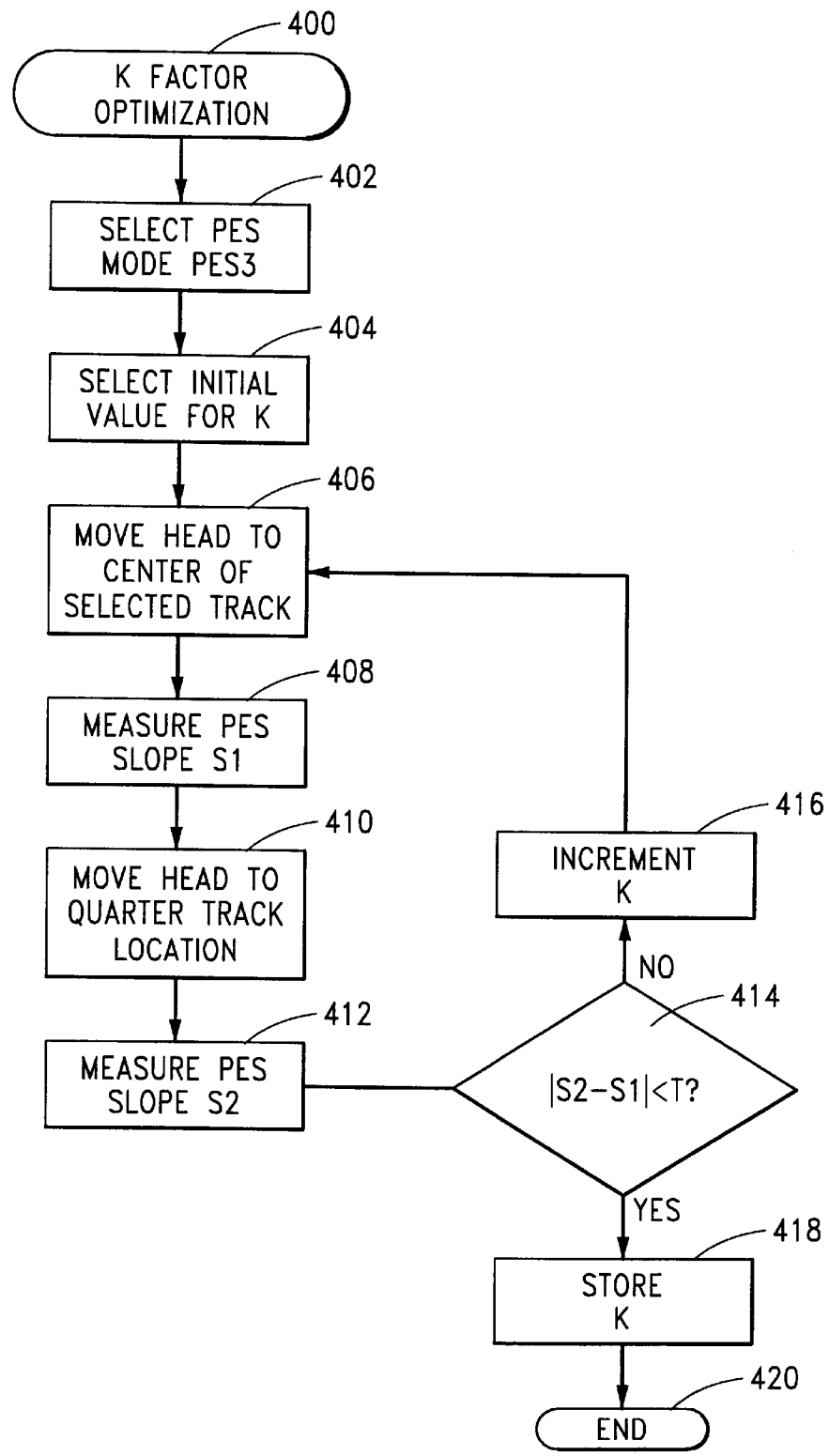

MULTI-MODE SERVO POSITION ERROR SIGNAL DEMODULATOR CIRCUIT

RELATED APPLICATIONS

This application claims priority to Provisional Application No. 60/193,303 filed Mar. 30, 2000.

FIELD THE INVENTION

This invention relates generally to the field of magnetic data storage devices, and more particularly, but not by way of limitation, to disc drive servo demodulation hardware configured to generate a position error signal (PES) from various selectable combinations of operand values derived from decoded servo position data, wherein the demodulation hardware provides the PES to a servo processor to effect head positional control.

BACKGROUND

Disc drives are used as primary data storage devices in modern computer systems and networks, due to the efficient and cost-effective manner in which large amounts of computerized data can be stored and retrieved. A typical disc drive comprises one or more rigid magnetic recording discs which are mounted to a spindle motor for rotation at a constant high speed. An array of read/write transducing heads are provided to transfer data between tracks of the discs and a host computer in which the disc drive is mounted. The heads are supported by a rotary actuator assembly and are controllably positioned adjacent the tracks by a closed loop, processor-based servo system.

The servo system primarily operates in one of two selectable modes: seeking and track following. A seek operation entails moving a selected head from an initial track to a destination track on the associated disc surface through the initial acceleration and subsequent deceleration of the head away from the initial track and toward the destination track. A velocity control approach is used whereby the velocity of the head is repeatedly measured and compared to a velocity profile defining a desired velocity trajectory for the seek. Once the head has settled on the destination track, the servo system enters a track following mode of operation wherein the head is caused to follow the destination track until the next seek operation is performed.

Both track seeking and track following operations typically require generation of a position error signal (PES) which gives an indication of the intratrack position of the head with respect to the particular track over which the head is disposed. A typical PES is provided with a magnitude of zero (0) when the head is positioned over the center of the track ("on track"), a magnitude of ±0.5 at track boundaries, and is nominally linearly proportional to relative misposition distances ("off track") between the track center and track boundaries. It is desirable to have a PES that exhibits a substantially constant slope across the width of the track as the head is swept from one track boundary to the next.

The PES is generated by using the head to transduce servo position data from the associated track to provide analog servo burst signals. A demodulation circuit of the servo system conditions the analog servo burst signals, including conversion to digital form, and provides the digital servo burst signals to a servo processor which combines the burst signals using a predetermined algorithm to arrive at the PES. As mentioned above, the PES identifies the actual location of the head with respect to the center of the track. The servo processor further identifies a desired (reference) position for the head, such as over the center of the track, or a selected percentage of track width away from the center of the track, such as +10% off-track. By differencing the PES and the desired position, an actual head position error is determined. The servo processor uses this actual position error to generate and output a digital current adjustment signal to a power amplifier circuit, which in turn adjusts the current applied to an actuator motor to adjust the position of the head accordingly. Thus, during track following the servo circuit continuously attempts to drive actual position error to zero.

To provide stable operation, the transfer function relating PES to actual radial misposition should be constant and independent of distance off track in the presence of variations in head signal amplitude, linear recording bit density, head to media spacing and head skew angle. In practice, however, these and other factors can introduce nonlinearities in the PES, adversely affecting the ability of the servo system to accurately position the heads. Since at least some of the factors that introduce PES nonlinearities are head and track location dependent, such nonlinearities are not constant across all head/track location combinations, but do typically tend to affect all head/track location combinations to a greater or lesser extent.

A continuing trend in the industry is to provide successive generations of disc drives with ever higher data storage capacities at lower cost. This has led to significant annual increases in track densities (greater than 60% per year for the past several years). As the tracks become narrower and closer together, the effects of PES nonlinearities become increasingly pronounced and consume greater amounts of servo processor resources to maintain acceptable levels of on-track performance. This can be mitigated to some extent through the introduction of higher performance, higher capability servo processors, but the introduction of such processors increases component cost and is directly counter to the demand for reduced cost drives.

There is therefore a continued need for improvements in the art to achieve robust head positional control in the face of continued increases in track densities and PES nonlinearities, and it is to such improvements that the present invention is directed.

SUMMARY OF THE INVENTION

The present invention is directed to an apparatus and method for positioning a head adjacent tracks on a recording surface in a disc drive.

In accordance with preferred embodiments, a servo control circuit includes a multi-mode servo position error signal (PES) demodulator circuit having an operand generator which outputs operand values from decoded servo position data transduced by a head from a disc. The demodulator circuit further includes a PES generator which generates a PES as a sequence of PES samples indicative of head position with respect to the disc surface in accordance with a selected PES mode from a population of mutually exclusive PES modes each derived from a different combination of selected operand values.

The demodulator circuit provides the PES to a programmable servo processor, which in turn outputs a corresponding sequence of current adjustment signal samples to adjust the current applied to an actuator motor in relation to the PES and a desired position. The servo processor selectably configures the PES generator for each track so that different PES modes are used for different tracks.

The tracks are preferably arranged in a plurality of concentric zones so that user data are written to each track in each zone at a constant frequency unique to each zone, and an individual PES mode is selected for each zone. Alternatively, a different PES mode can be selected for each individual track on each surface.

To select optimal PES modes, the disc drive preferably performs steps of initially defining a population of mutually exclusive PES modes each derived from a different combination of selected operand values obtained in turn from servo position data stored on the recording surface; positioning the head adjacent a selected track on the recording surface; for each of the population of PES modes, sequentially generating a sequence of PES samples from the servo position data associated with the selected track; identifying an optimal PES mode from the population of PES modes in relation to linearity across a radial width of the selected track of the respective sequences of PES samples; and, thereafter, using the optimal PES mode to generate a position error signal when the head is positioned adjacent the selected track.

These and various other features and advantages which characterize the present invention will be apparent from a reading of the following detailed description and a review of the associated drawings.

BRIEF DESCRIPTION OF THE DRAWINGS

FIG. 3 illustrates the manner in which servo data are preferably arranged on the tracks of the disc drive.

FIG. 4 illustrates a preferred configuration of A, B, C, and D servo burst patterns of the position field of FIG. 3.

FIG. 5 illustrates an alternative preferred configuration of A, B, C, and D servo burst patterns of the position field of FIG. 3.

FIG. 8 provides a functional block diagram of relevant portions of the demodulation hardware of FIG. 2 in conjunction with the digital signal processor (DSP) of FIG. 2 in accordance with preferred embodiments.

FIG. 9 provides a schematic diagram for a preferred construction of the operand generator of FIG. 8.

FIG. 10 provides a schematic diagram for a preferred construction of the PES generator of FIG. 8, the PES generator having multi-mode PES selection capability to generate the PES in relation to a selected combination of operands generated by the operand generator.

FIG. 11 is a flow chart for a K FACTOR OPTIMIZATION routine, illustrative of steps preferably carried out by the DSP to select optimum values of a factor k used in one of the PES modes.

DETAILED DESCRIPTION

Figure 1:
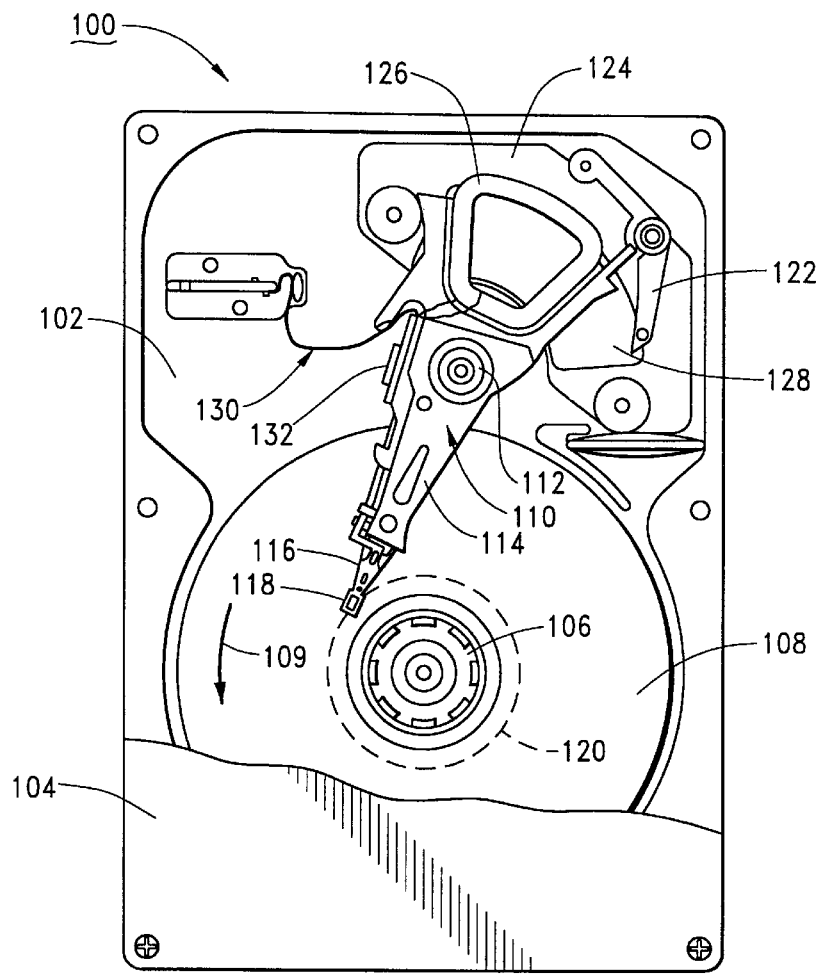
FIG. 1 is a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) rotates a plurality of axially-aligned, rigid, magnetic recording discs 108 at a constant speed in rotational direction 109. User data are written to and read from tracks (not designated) on the discs 108 through the use of an actuator 110, which rotates about a bearing shaft assembly 112 positioned adjacent the discs 108.

The actuator 110 includes a plurality of rigid actuator arms 114. Flexible suspension assemblies 116 (flexures) are attached to the distal end of the actuator arms 114 to support a corresponding array of heads 118, with one head adjacent each disc surface. Each head 118 includes a slider assembly (not separately designated) designed to fly in close proximity to the corresponding surface of the associated disc 108. When the disc drive 100 is deactivated, the heads 118 come to rest on texturized landing zones 120 and the actuator 110 is secured using a magnetic latch 122.

A voice coil motor (VCM) 124 includes an actuator coil 126 and permanent magnet 128. Application of current to the coil 126 induces rotation of the actuator 110 about the pivot assembly 112. A flex circuit assembly 130 provides electrical communication paths between the actuator 110 and a disc drive printed circuit board assembly (PCBA) mounted to the underside of the base deck 102. The flex circuit assembly 130 includes a preamplifier/driver circuit 132 ("preamp") which applies currents to the heads 118 to read and write data.

Figure 2:
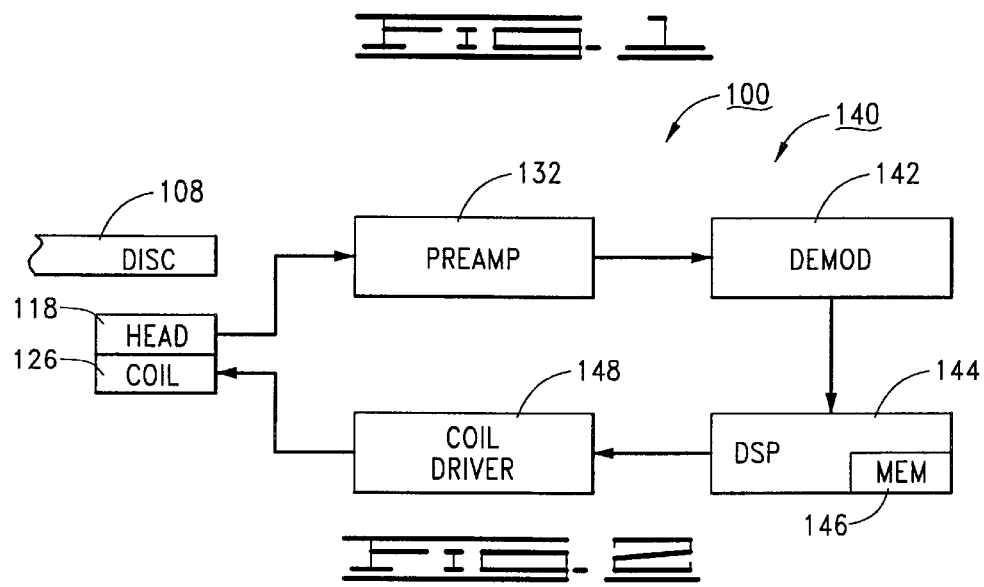
FIG. 2 is a functional block diagram of a servo control circuit of the disc drive, including demodulation hardware (demod) constructed in accordance with preferred embodiments of the present invention.

FIG. 2 provides a functional block diagram of a closed loop servo control circuit 140 which provides head positional control in accordance with preferred embodiments. The servo control circuit 140 includes novel demodulation circuit hardware (demod) 142, a digital signal processor (DSP) 144 with associated memory 146, and power amplifier and driver circuitry (coil driver) 148, all of which are mounted on the aforementioned disc drive PCBA.

FIG. 3 shows a portion of a track 150 from a selected disc surface to illustrate the general manner in which data are arranged on the discs 108. Each track 150 includes a plurality of periodically spaced servo data fields 152 which are written during disc drive manufacturing. User data fields, or sectors, are subsequently formed in user data zones 154 between adjacent servo data fields 152 during a disc drive formatting operation. Each servo field 152 preferably includes an automatic gain control (AGC) field 156, a synchronization (sync) field 158, an index field 160, a Gray code (GC) field 162 and a position field 164. Of particular interest is the format for the position field 164, but for purposes of completeness it will be noted that the AGC field 156 stores an oscillating pattern of selected frequency and amplitude to prepare the servo control circuit 140 for proper decoding of the remaining data; the sync field 158 provides a unique sync word for identification and timing purposes;

the index field 160 identifies angular position of the servo field 152; and the GC field 162 identifies radial position (track address) of the track 150.

The position field 164 provides a series of servo burst patterns which enables the servo control circuit 140 to identify intratrack position of the head 118. A variety of configurations for the position field 164 can be used, with two preferred configurations respectively shown in FIGS. 4 and 5.

FIG. 4 shows A, B. C and D burst patterns 170, 172, 174 and 176 for a series of adjacent tracks (with track boundaries denoted at 1–5). The A and B burst patterns 170, 172 are abuttingly, angularly aligned as shown to form a first null at each track center (denoted by dotted lines between adjacent track boundaries), and the C and D burst patterns 174, 176 are likewise abuttingly, angularly aligned to form a second null at each track boundary. Preferably, the A and B burst patterns 170, 172 are written as high frequency oscillating magnetization patterns of opposite phase. This is also preferably the case for the C and D patterns 174, 176.

FIG. 5 shows A, B, C and D burst patterns 180, 182, 184 and 186 for a corresponding series of adjacent tracks (also with track boundaries denoted as 1–5). Unlike the angularly aligned patterns of FIG. 4, the A, B. C and D burst patterns 180, 182, 184 and 186 are angularly offset, but are nevertheless abuttingly aligned so that the A and B burst patterns 180, 182 form a first null at the track centers and the C and D burst patterns 184, 186 form a second null at the track boundaries. Preferably, the A, B, C and D burst patterns 180, 182, 184 and 186 are written as high frequency oscillating magnetization patterns in a common phase.

From a review of the respective configurations of FIGS. 4 and 5, it will be noted that different burst signals will be generated as the head 118 transduces the respective patterns. In FIG. 4, as the head transduces the A and B burst patterns 170, 172, a single burst signal (hereinafter referred to as "PS1") will be generated having a magnitude determined from the combined magnetization of the A and B burst patterns. Likewise, as the head transduces the C and D burst patterns 174, 176, a single burst signal (hereinafter referred to as "PS2") will be generated having a magnitude determined from the combination of the C and D burst patterns 174, 176.

Figure 6:
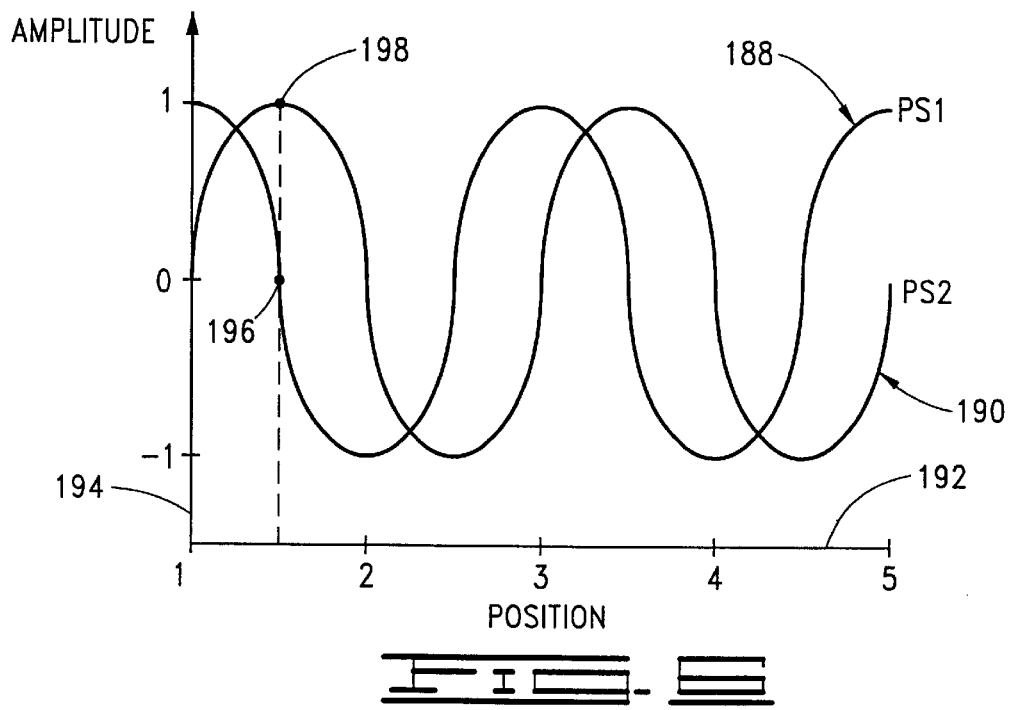
FIG. 6 provides a graphical representation of idealized analog servo burst signals PS1 and PS2 obtained from the burst patterns of FIG. 4 or 5.

Idealized PS1 and PS2 burst signals are graphically represented in FIG. 6 as respective curves 188 and 190, plotted against an x-axis 192 indicative of radial position (across the track boundaries 1–5) and a y-axis 194 indicative of amplitude. The PS1 and PS2 burst signals are substantially sinusoidal, respectively 90 degrees out of phase, and normalized over a ±1 amplitude interval. It will be recognized that the PS1 and PS2 signals are initially expressed as analog readback signals from the head, but are preferably normalized and converted to digital form with values corresponding to the ranges shown in FIG. 6.

When the head 118 is positioned as shown in FIG. 1 (i.e., over the center of the track between boundaries 1 and 2), the transduced A and B magnetizations will cancel, resulting in a PS1 signal magnitude of zero (as shown at point 196). At the same time, the transduced C magnetization will be substantially at a maximum and the transduced D magnetization will be substantially zero, resulting in a maximum amplitude of +1 for the PS2 signal (as shown at point 198). Remaining values for the PS1 and PS2 signals follow as the head 118 is swept across the track boundaries 1–5.

Using the position field arrangement of FIG. 5, however, separate A, B, C and D burst signals are generated as the head 118 transduces each pattern in turn. However, the PS1 and PS2 signals can be readily obtained from these A, B. C and D burst signal magnitudes using the following relations:

$$PS1 = A - B \quad (1)$$

$$PS2 = C - D \quad (2)$$

It will be noted that the burst pattern configurations of FIGS. 4 and 5 and the PS1 and PS2 signals represented in FIG. 6 are merely for purposes of illustrating preferred embodiments and are not limiting to the scope of the invention as claimed below.

Figure 7:
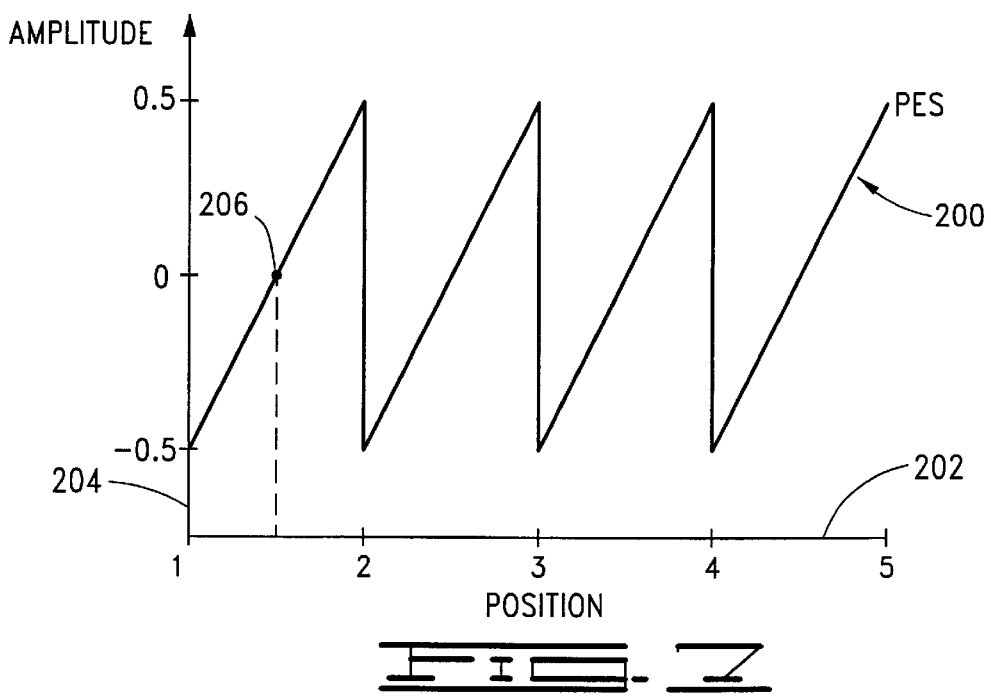
FIG. 7 provides a graphical representation of an idealized position error signal (PES) obtained from the PS1 and PS2 signals of FIG. 6, the PES indicative of actual position of a selected head with respect to a series of corresponding adjacent tracks as the head sweeps across the tracks.
Figure 7:
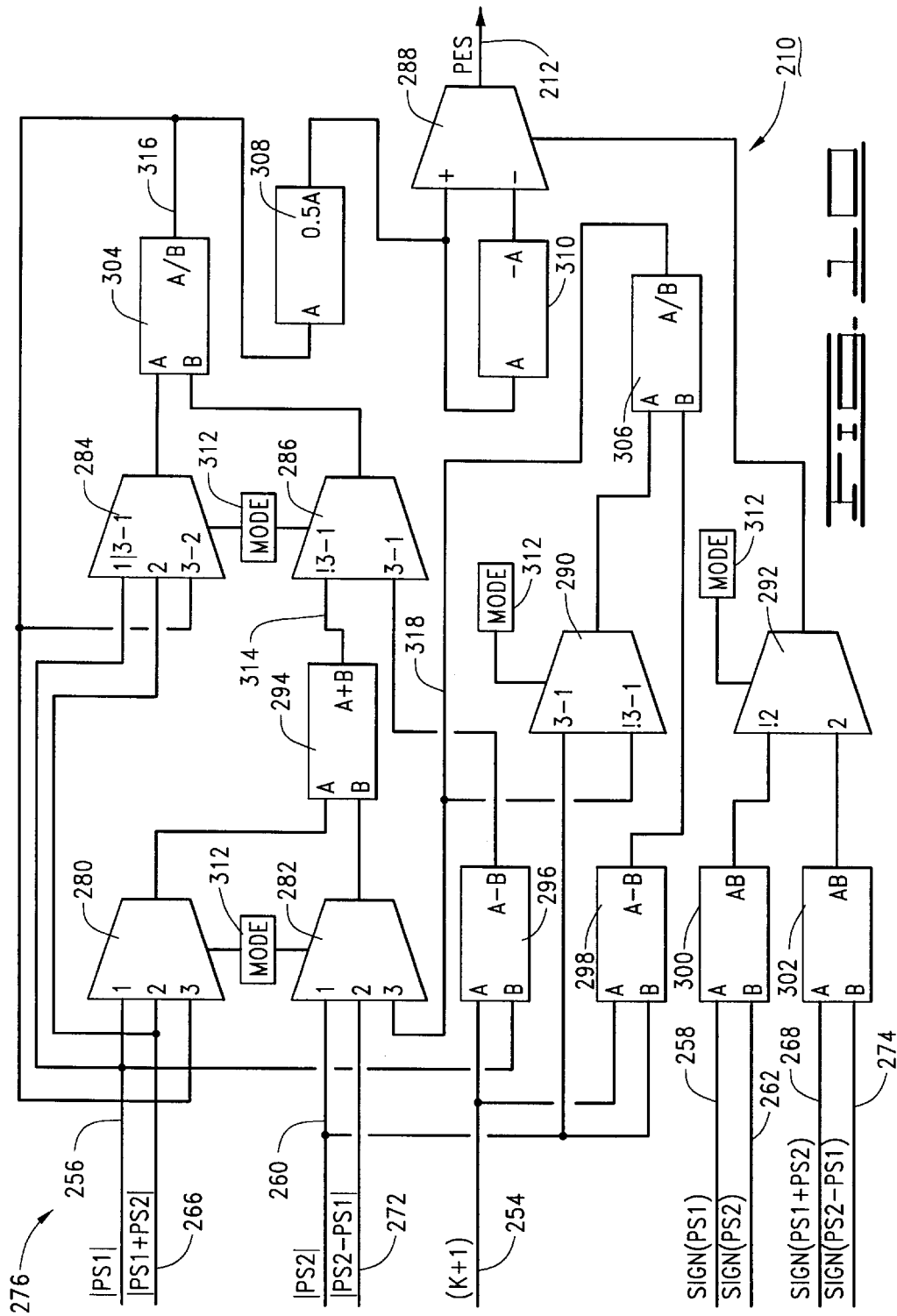

The PS1 and PS2 signals are combined to generate a position error signal (PES) indicative of actual head position. FIG. 7 provides a graphical representation of an idealized position error signal (PES) curve 200, plotted against an x-axis 202 (corresponding to the track boundaries 1–5) and a y-axis 204 indicative of amplitude. The PES curve 200 is normalized over a range of ±0.5 and exhibits nominally linear characteristics across each track. The PES provides a value of zero when the head 118 is positioned over the center of each track, as shown at point 206 for the head position shown in FIGS. 4 and 5. Again, the PES is typically expressed digitally over a range that corresponds to the analog range shown in FIG. 7.

While FIG. 7 provides an idealized PES representation, in practice, various factors such as head signal amplitude, linear recording bit density, head to media spacing and head skew angle can contribute to introduce nonlinearities in the PES, so that the slope between adjacent track boundaries is nonconstant and include higher order components (and in some cases, discontinuities). The manner in which the present invention preferably operates to compensate for such nonlinearities will be discussed below after a brief introduction of different selectable modes, or combinations, preferably utilized by the servo control circuit 140 to determine the PES from the PS1 and PS2 signals.

In a first mode, hereinafter referred to as "PES1," the PES is determined by the following relation:

$$PES1 = \frac{|PS1|}{2(|PS1| + |PS2|)} sign(PS1) sign(PS2) \quad (3)$$

where |PS1| is the absolute magnitude of the PS1 signal (such as 0 at point 196 in FIG. 6), |PS2| is the absolute magnitude of the PS2 signal (such as +1 at point 198 in FIG. 6), and sign(PS1), sign(PS2) are the respective polarities, or signs, of the PS1 and PS2 signals.

In a second, alternative mode ("PES2"), the PES is determined as follows:

$$PES2 = \frac{|PS1 + PS2|}{2(|PS1 + PS2| + |PS2 - PS1|)} sign(PS1 + PS2) sign(PS2 - PS1) \quad (4)$$

where |PS1+PS2| is the absolute magnitude of the sum of the PS1 and PS2 signals, |PS2−PS1| is the absolute magnitude of the difference between the PS2 and PS1 signals, and sign(PS1+PS2) and sign(PS2−PS1) are the respective polarities of the respective operands.

In a third, alternative mode ("PES3"), the PES is determined as follows:

$$PES3 = \frac{\frac{|PS1|}{(k+1)-|PS1|}}{\frac{|PS1|}{(k+1)-|PS1|} + \frac{|PS2|}{(k+1)-|PS2|}} - \left(\frac{1}{2}\right)sign(PS1)sign(PS2) \quad (5)$$

where as before, PS1 is the absolute magnitude of the PS1 signal, |PS2| is the absolute magnitude of the PS2 signal, sign(PS1), sign(PS2) are the respective polarities of the PS1 and PS2 signals, and k is a small positive value. The manner in which the k factor can be advantageously selected will be discussed shortly. It will be noted that PES2 will be offset ¼ cycle out of phase as compared to PES1 and PES3. This offset can be readily eliminated by adding an appropriate adjustment value.

FIG. 8 illustrates relevant portions of the novel demodulation circuit hardware 142 of FIG. 2 (hereinafter also referred to as the "demodulator") configured in accordance with preferred embodiments to generate the PES in accordance with one of the above selectable modes. The demodulator includes an operand generator circuit 208 which, in response to PS1, PS2 and k+1 inputs, outputs a series of operand values to a PES generator circuit 210. The PES generator circuit 210, in response to a PES mode select input (i.e., selection of modes PES1, PES2, or PES3), combines the appropriate operand values from the operand generator circuit to output a PES signal on path 212 for use by the DSP 144.

Additional circuitry in FIG. 8 includes a k+1 table 216 which supplies an appropriate analog signal representation of k+1 to the operand generator circuit 208 in response to a selection input from the DSP 144; a PES mode select circuit 218 which identifies the desired PES mode for use by the PES generator circuit 210 in response to a mode selection input by the DSP; and a clock circuit 220 which provides clock inputs to the PES generator circuitry 210.

FIG. 9 provides a generalized schematic diagram for a preferred construction of the operand generator 208 of FIG. 8. For convenience, Table 1 identifies various multi-bit, gated logic components of FIG. 9. It will be understood that the diagram of FIG. 8 has been provided to show a preferred logical flow for the operand generator circuit 208 and so additional components, such as latches or pull-up/pull-down resistors, may be advantageously utilized as desired, depending upon the requirements of a given application.

TABLE 1

| Reference Numeral | Description |
|---|---|
| 222 | Sign Detector (Comparator) |
| 224 | Sign Detector (Comparator) |
| 226 | Sign Detector (Comparator) |
| 228 | Sign Detector (Comparator) |
| 230 | Inverter |
| 232 | Inverter |
| 234 | Inverter |
| 236 | Inverter |
| 238 | Switch |
| 240 | Switch |
| 242 | Switch |
| 244 | Switch |
| 246 | Summing Junction (+) |
| 248 | Summing Junction (−) |

It will be understood that the PS1 and PS2 input signals provided on input paths 250, 252 respectively are initially transduced from the A. B, C and D servo burst patterns (FIGS. 4 and 5), preamplified by the preamp 132 (FIGS. 1 and 2), normalized such as through the use of an AGC stage and an adaptive filtering stage (not separately shown), and converted to digital form. Alternatively, the operand generator 208 and the PES generator 210 could be configured to generate an analog PES using substantially the same logical flows (with corresponding analog components), in which case the PES would be subsequently converted to digital form for use by the DSP 144.

The k+1 input is provided from the k+1 select circuit (FIG. 8) on path 254, and preferably passes through as shown. Since the k+1 signal is not operated upon by the embodiment of FIG. 9, it will be recognized that the k+1 signal could simply be provided directly to the PES generator 210, but for purposes of discussion it is believed clearer to include the k+1 signal as among the operand values passed to (and operated upon by) the PES generator 210.

The absolute magnitude of the PS1 signal, that is, |PS1|, is generated by the combined operation of sign detector 222, inverter 230 and switch 238. More particularly, the PS1 signal magnitude is provided to the + input of the switch 238, the inverter 230 inverts the PS1 signal to provide a −PS1 signal magnitude to the − input of the switch 238, and the sign detector 222 identifies the polarity of the PS1 signal magnitude. The output of the sign detector 222 selects the appropriate + or − input so that the switch 238 outputs a |PS1| operand signal on path 256 with a magnitude equal to the absolute magnitude of the input PS1 signal. Since the sign of PS1 is also among the operands used by the PES modes of equations (3)–(5), a PS1 sign operand signal (i.e., a+1 or a−1) is also output on path 258 in relation to the detected sign of the PS1 signal.

In similar fashion, the sign detector 224, inverter 232 and switch 240 operate to output a |PS2| operand signal on path 260 and a PS2 sign operand signal on path 262.

The summing junction 246 generates a (PS1+PS2) signal on path 264. The sign detector 226, inverter 234 and switch 242 thereafter operate to generate a |PS1+PS2| operand signal on path 266 and a (PS1+PS2) sign operand signal on path 268. Finally, the summing junction 248 generates a (PS2−PS1) signal on path 270, and the sign detector 228, inverter 236 and switch 244 thereafter operate to generate a |PS2−PS1| operand signal on path 272 and a (PS2−PS1) sign operand signal on path 274. It will be noted that the respective operand signals on paths 254, 256, 258, 260, 262, 266, 268, 272 and 274 represent all of the possible operands of equations (3)–(5) and are collectively identified as the set of operand values provided to the PES generator circuit 210 in FIG. 8 along combined path 276.

FIG. 10 provides a generalized schematic diagram for a preferred construction of the PES generator circuit 210 of FIG. 8. For convenience, Table 2 identifies various multi-bit, gated logic components shown in FIG. 10. As before, FIG. 10 shows the general logical flow of the PES generator circuit 210 so that separate clock inputs to various components have been omitted for clarity, and additional components may be advantageously utilized as desired.

TABLE 2

| Reference Numeral | Description |
|---|---|
| 280 | Switch |
| 282 | Switch |
| 284 | Switch |
| 286 | Switch |
| 288 | Switch |
| 290 | Switch |
| 292 | Switch |
| 294 | Summing Junction (+) |

TABLE 2-continued

| Reference Numeral | Description |
| --- | --- |
| 296 | Summing Junction (−) |
| 298 | Summing Junction (−) |
| 300 | Multiplier |
| 302 | Multiplier |
| 304 | Divider |
| 306 | Divider |
| 308 | Multiplier (0.5) |
| 310 | Inverter |

From a review of equations (3)–(5) it will be noted that PES1 and PES2 are calculated with one pass through the circuit, while PES3, which includes an additional division step, requires a second pass. Thus, the notations 1, 2 and 3 for the various switch inputs denote the selected mode (i.e., either PES1, PES2 or PES3), the notation 3-1 indicates the first pass through PES3, and the notation 3-2 indicates the second pass through PES3. An exclamation mark notation "!" means "not," so for example switch 292 passes the "2" input when PES2 mode is selected, and the remaining "!2" input when PES1 or PES3 modes are selected. Mode blocks 312 represent the mode selection inputs provided by the PES mode select circuit 218 (FIG. 8).

The dividers 304, 306 each use a conditional-subtraction methodology to perform an unsigned 16 bit division. When performing PES1 and PES2 mode calculations, and the second pass of the PES3 mode calculations, the dividers 304. 306 each preferably generate a Q=15, fixed-point integer result. Because the results of the first pass of PES3 mode may be larger than one (1), Q=12, fixed point integer results are preferably generated on these passes. The dividers 304, 306 each processes two bits of the result every clock cycle, requiring eight clocks to complete a division. Generally, it takes 10 clock cycles to calculate PES1 and PES2 modes, and twice as long to calculate PES3 mode. It will be noted that other configurations of divider circuitry and other levels of precision can be used.

To illustrate operation of the PES generator circuit 210, each selectable mode (PES1, PES2 and PES3) will be considered in turn. When PES1 is selected, the |PS1| and |PS2| operand signals (on paths 256, 260) are passed through the respective switches 280, 282 and summed by the summing junction 294 to provide a (|PS1|+|PS2|) operand signal at path 314. Switch 286 passes this operand to the denominator (B) input of the divider 304. Concurrently, the |PS1| operand signal is passed through the switch 284 and supplied to the numerator (A) input of the divider 304. The resulting (A/B) value is output on path 316 to the multiplier 308, where the value is multiplied by 0.5 and provided to the + input of the switch 288. The value is also inverted by inverter 310 so that the inverted value is presented to the − input of the switch 288. Sign(PS1) and sign(PS2) operand signals (paths 258, 262) are multiplied by the multiplier 300. The resulting product (either +1 or −1) is passed through the switch 292 and selects the appropriate ± input of the switch 288, resulting in the PES signal on path 212.

When PES2 is the selected mode, switches 280 and 282 pass the respective |PS1+PS2| and |PS2−PS1| operand signals (from input paths 266, 272) to summing junction 294, and the resulting sum is passed through the switch 286 to the denominator (B) input of divider 304. Switch 284 passes the |PS1|30 PS2| operand signal to the numerator (A) input of divider 304. The resulting (A/B) value is again passed through the multiplier 308 and inverter 310 so that opposite polarity values are presented as inputs to the switch 288.

Multiplier 302 multiplies the sign(PS1+PS2) and sign (PS2−PS1) operand signals, and the product is passed through the switch 292 to select the appropriate output to provide the PES signal on path 212.

When PES3 is the selected mode during the first pass through the circuit, the |PS1| operand signal (path 256) is passed by switch 284 to the numerator (A) input of the divider 304. The |PS1| operand signal is further differenced with the (k+1) operand signal (path 254) at summing junction 296, and the resulting (A–B) difference is passed via switch 286 to the denominator (B) input of the divider 304. It will be noted that the resulting quotient from this operation generates the numerator value (and half of the denominator value) of equation (5), i.e., |PS1|/((k+1)−|PS1|). For convenience, this term will be referred to herein as "X."

Concurrently, the |PS2| operand signal (path 260) is passed via switch 290 to the numerator (A) input of the divider 306. The |PS2| operand signal is further differenced with the (k+1) operand signal (path 254) at summing junction 298, and the resulting (A–B) difference is passed to the denominator (B) input of the divider 306. It will be noted that the resulting quotient from this operation generates the remaining half of the denominator value of equation (5), i.e., |PS2|/((k+1)−|PS2|). For convenience, this term will be referred to herein as "Y." This concludes the first pass through the PES generator circuit 210.

For the second pass, the X term from the divider 304 is passed via path 316 back through switch 280 to become the A input to the summing junction 294, and the Y term from the divider 306 is similarly passed via path 318 back through switch 282 to become the B input to the summing junction 294. It will be noted that the Y term (on path 318) is also shown as an input to switch 290, but is not further used in this regard (using switch 290 in this way simplifies timing and construction issues, but other configurations can also readily be employed). The X+Y output of summing junction 294 is passed through switch 286 to the denominator (B) input of the divider 304. The X term is supplied to the numerator (A) input of the divider 304 via switch 284. This second operation of the divider 304 results in the output X/(X+Y), which is then passed through the multiplier 308, inverter 310 and switch 288 (in relation to sign selection input from multiplier 300 and switch 292) to output the PES3 value on path 212.

From a review of FIGS. 9 and 10, it can be seen that the demodulator 142 can provide PES samples to the DSP 144 in an exceptionally fast and computationally efficient manner. Due to the shared gating of the PES generator 210 for each of the different modes, relatively very little additional circuitry is required to incorporate the operand generator 208 and PES generator 210 into an existing application specific integrated circuit (ASIC) design used to house remaining portions of the demodulation hardware. The flexibility of the PES generator 210 allows any number of potentially desired PES modes to be incorporated and subsequently selected by the DSP 144.

While the particular PES modes used in a given application are largely a matter of design choice, the PES3 mode disclosed herein has been found to be particularly advantageous in compensating for higher order PES nonlinearities, when an appropriate value for k is selected. Thus, FIG. 11 provides a flow chart for a K FACTOR OPTIMIZATION routine 400, illustrative of steps carried out by the DSP 144 at appropriate times, such as during disc drive manufacturing.

The routine begins at step 402 wherein mode PES3 is selected. This is preferably carried out by the DSP 144 supplying the appropriate input to the PES mode select circuit 218 (FIG. 8), which in turn configures the pathways within the PES generator 210 of FIG. 10 accordingly. Next, at step 404 an initial value of k is selected; as discussed above, a suitable initial value is a small positive value (such as 0.1). This step preferably entails provision of the appropriate selection input by the DSP 144 to the k+1 select circuit 216 to provide the k+1 signal on path 254.

At step 406, a selected head 118 is positioned over the center of a selected track (such as illustrated in FIGS. 4 and 5), and a first PES slope S1 is measured at step 408. A preferred methodology for measuring the slope S1 involves applying small changes in current to the coil 126 to cause the head to oscillate slightly about the track center and obtain PES samples at each oscillation extreme. As desired, additional measurements on different tracks can also be taken and averaged to arrive at the final S1 value.

The head 118 is then moved to a quarter track location halfway between the track center and a selected track boundary, step 410, and a second slope S2 measurement is obtained, step 412. The absolute magnitude of the difference between the slopes S2, S1 is then compared to a small threshold value T, decision step 414, to determine whether the initially selected k factor value provides sufficiently linear PES slope. If not, the k factor is incremented at step 416 and the routine is repeated for this new value of k. Once a sufficiently suitable value of k is determined for the selected head, the value is stored at step 418 and the process ends at step 420. It will be noted that an optimal value of k is preferably selected for each head in turn.

Figure 12:
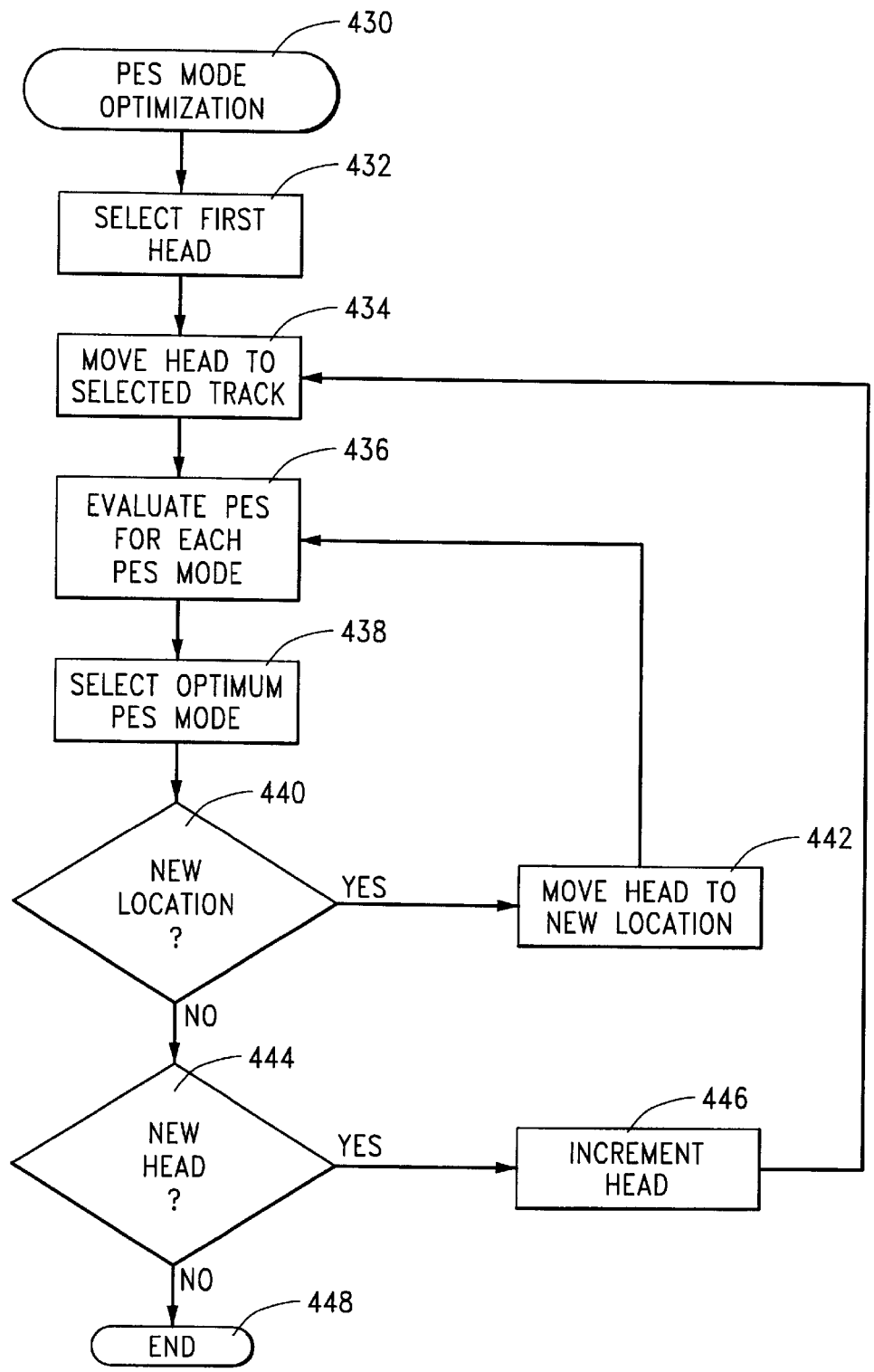
FIG. 12 is a flow chart for a PES MODE OPTIMIZATION routine. illustrative of steps preferably carried out by the DSP to identify an optimum PES mode for various head/track location combinations.

FIG. 12 provides a flow chart for a PES MODE OPTIMIZATION routine 430, illustrative of steps carried out by the DSP 144 in accordance with preferred embodiments to identify an optimal PES mode (PES1, PES2, PES3) for various head/track location combinations, thereby taking advantage of the mode selection capability of the demodulation hardware 142 of FIG. 8. At step 432, the first head 118 to be evaluated is selected, after which the selected head is moved to a selected track 150 on the corresponding disc recording surface at step 434. At step 436, the linearity of the PES is evaluated for each mode (PES1, PES2, PES3) in turn.

One preferred methodology is to use the S1, S2 slope measurement methodology previously discussed with reference to the routine of FIG. 11; another preferred methodology is to slowly sweep the head 118 across the track from one track boundary to the next at a constant rate and evaluate the PES samples obtained thereby. Based on the particular factors that have the greatest impact upon the operation of the drive for this first head/track location combination, it is contemplated that an optimal PES mode can be identified that provides the best PES characteristics, and this mode is selected and thereafter used for tracks in this particular vicinity. It is contemplated, for example, that PES mode selection can occur on a zone basis for disc drives employing zone based recording (ZBR) in which each recording surface is divided into a number of concentric zones, each zone having a selected number of tracks recorded at a constant density. In such case, an appropriate PES mode is selected for use with the tracks in each zone.

Once the optimal PES mode is selected at step 438, if evaluation of a different location on the disc surface is desired (as shown by decision step 440), the routine passes to step 442 wherein the head 118 is moved to the new location and the routine returns to step 436. Once all of the desired locations on the disc surface have been evaluated, decision step 444 determines whether PES mode evaluation is desired for a different head; if so, the routine passes to step 446 wherein a new head is selected and the process is repeated. Once all desired head/track location combinations have been evaluated, the routine exits from decision step 444 and ends at step 448.

In view of the foregoing, it will be understood that the present invention is directed to an apparatus and method for positioning a head adjacent tracks on a recording surface in a disc drive. In one aspect of the present invention, a servo control circuit 140 includes a multi-mode servo position error signal (PES) demodulator circuit 142 having an operand generator 208 which outputs operand values (path 276) from decoded servo position data 170 transduced by a head 118 from a disc 108, and a PES generator 210 which generates a PES 200 as a sequence of PES samples indicative of head position with respect to the disc surface in accordance with a selected PES mode from a population of mutually exclusive PES modes each derived from a different combination of selected operand values.

In accordance with another aspect, a programmable servo processor 144 outputs a corresponding sequence of current adjustment signal samples to adjust the current applied to an actuator motor 124 in relation to the PES and a desired position. The servo processor selectably configures the PES generator for each track so that different PES modes are used for different tracks.

In accordance with another aspect, the tracks are arranged in a plurality of concentric zones so that user data are written to each track in each zone at a constant frequency unique to each zone, and wherein the servo processor configures the PES generator to use a selected PES mode for all of the tracks in each zone so that different PES modes are used for different zones.

In accordance with yet another aspect, the disc drive performs steps of initially defining a population of mutually exclusive PES modes each derived from a different combination of selected operand values obtained in turn from servo position data stored on the recording surface; positioning the head adjacent a selected track on the recording surface (step 434, FIG. 12); for each of the population of PES modes, sequentially generating a sequence of PES samples from the servo position data associated with the selected track (step 436, FIG. 12); identifying an optimal PES mode from the population of PES modes in relation to linearity across a radial width of the selected track of the respective sequences of PES samples (step 438); and, thereafter, using the optimal PES mode to generate a position error signal when the head is positioned adjacent the selected track.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A servo circuit configured for use in a disc drive to apply current to an actuator motor to position a head adjacent tracks defined on a disc surface, comprising:

an operand generator which outputs operand values from decoded servo position data transduced by the head from the disc surface;

a position error signal (PES) generator which generates a PES as a sequence of PES samples indicative of head position with respect to the disc surface in accordance with a selected PES mode from a population of mutually exclusive PES modes each derived from a different combination of selected operand values; and a servo processor coupled to the PES generator which outputs a corresponding sequence of current adjustment signal samples to adjust the current applied to the actuator motor in relation to the PES and a desired position, wherein the servo processor selectably configures the PES generator so that different ones of the population of mutually exclusive PES modes are used for different tracks on the disc surface.

2. The servo circuit of claim 1, in which the servo processor selects the PES mode for a selected track by positioning the head over the selected track, sequentially obtaining a series of PES samples for each of the different PES modes and evaluating linearity of each of the series of PES samples.

3. The servo circuit of claim 1, in which the PES generator comprises:

divider circuitry which performs an unsigned division operation A/B in response to a numerator input A and a denominator input B; and switch circuitry which routes selected combinations of the operand values to the respective numerator and divider inputs A and B in relation to the selected PES mode so that each series of PES samples for each of the population of mutually exclusive PES modes is generated by the divider circuitry.

4. The servo circuit of claim 3, in which during at least one selected PES mode each PES sample is generated using a single pass of operand values through the divider circuitry, and in which during at least one other selected PES mode each PES sample is generated using multiple, successive passes of operand values through the divider circuitry.

5. The servo circuit of claim 1, wherein the operand values comprise absolute magnitudes of normalized decoded servo position data signals.

6. The servo circuit of claim 1, wherein the operand values comprise sign values indicative of polarities of normalized decoded servo position data signals.

7. The servo circuit of claim 1, wherein the tracks are arranged in a plurality of concentric zones so that user data are written to each track in each zone at a constant frequency unique to each zone, and wherein the servo processor configures the PES generator to use a selected PES mode for all of the tracks in each zone so that different PES modes are used for different zones.

8. A disc drive, comprising:

a head adjacent a rotatable disc on which servo position data are stored to define a plurality of concentric tracks; and means for generating a position error signal (PES) as a sequence of PES samples indicative of head position in accordance with a selected PES mode from a population of mutually exclusive PES modes each derived from a different combination of selected operand values determined in turn from servo position data signals transduced by the head, in which different ones of the population of mutually exclusive PES modes are used to generate the PES for different tracks.

9. The disc drive of claim 8, further comprising:

a servo processor, responsive to the generating means, which outputs a corresponding sequence of current adjustment signal samples to adjust the current applied to the actuator motor in relation to the PES and a desired position.

10. The disc drive of claim 8, in which the tracks are arranged in a plurality of concentric zones so that user data are written to each track in each zone at a constant frequency unique to each zone, and wherein the generating means uses a selected PES mode for all of the tracks in each zone so that different PES modes are used for different zones.

11. A method for positioning a head adjacent tracks defined on a recording surface of a disc drive, comprising steps of:

(a) defining a population of mutually exclusive PES modes each derived from a different combination of selected operand values obtained in turn from servo position data stored on the recording surface;

(b) positioning the head adjacent a selected track on the recording surface;

(c) for each of the population of PES modes, sequentially generating a sequence of PES samples from the servo position data associated with the selected track;

(d) identifying an optimal PES mode from the population of PES modes in relation to linearity across a radial width of the selected track of the respective sequences of PES samples; and, thereafter, (e) using the optimal PES mode to generate a position error signal when the head is positioned adjacent the selected track.

12. The method of claim 11, further comprising a step of:

(f) repeating steps (b) through (e) for each of a plurality of tracks on the recording surface to identify a respective optimal PES mode for each of the plurality of tracks, wherein at least one of the plurality of tracks has a different optimal PES mode as compared to at least another one of the plurality of tracks.

13. The method of claim 12, further comprising a step of dividing the tracks into a plurality of concentric zones so that user data are written to each track in each zone at a constant frequency unique to each zone, wherein each of the plurality of tracks of repeating step (f) is disposed in a different zone, and wherein the respective optimal PES mode identified for each selected track in each zone is further used for all of the remaining tracks in each zone.

14. The method of claim 11, further comprising a step of providing a multi-mode demodulator circuit comprising an operand generator which outputs the operand values from decoded servo position data transduced by the head from the disc surface and a position error signal (PES) generator which generates the respective sequences of PES samples in relation to the population of PES modes.

15. The method of claim 14, further comprising a step of providing a programmable servo processor coupled to the multi-mode demodulator circuit which outputs a corresponding sequence of current adjustment signal samples to adjust the current applied to an actuator motor in relation to the sequence of PES samples for each of the population of PES modes, wherein the servo processor is configured to provide a PES selection signal to the multi-mode demodulator circuit to select the optimal PES mode for the selected track.

16. The method of claim 11, wherein the operand values of defining step (a) comprise absolute magnitudes of normalized decoded servo position data signals.

17. The method of claim 16, wherein the operand values of defining step (a) further comprise sign values indicative of polarities of normalized decoded servo position data signals.

* * * * *